(12) United States Patent
Oh et al.

(10) Patent No.: US 9,893,659 B2
(45) Date of Patent: Feb. 13, 2018

(54) CONFIGURATION, FREQUENCY REGISTERS GENERATING POWER FROM MOTOR IN SUPPLY-LOSS EVENT

(71) Applicant: TEXAS INSTRUMENTS INCORPORATED, Dallas, TX (US)

(72) Inventors: Seil Oh, Plano, TX (US); Tuan V. Tran, Brighton, CO (US); David R. Street, Longmont, CO (US); Juergen Luebbe, Lucas, TX (US); Quang Dieu An, Plano, TX (US); John K. Rote, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 96 days.

(21) Appl. No.: 15/019,326

(22) Filed: Feb. 9, 2016

(65) Prior Publication Data
US 2016/0233805 A1    Aug. 11, 2016

Related U.S. Application Data

(60) Provisional application No. 62/113,618, filed on Feb. 9, 2015.

(51) Int. Cl.
| | | |
|---|---|---|
| *H02P 1/04* | (2006.01) | |
| *H02P 6/24* | (2006.01) | |
| *H02P 3/14* | (2006.01) | |
| *H02P 3/18* | (2006.01) | |
| *H02P 6/182* | (2016.01) | |

(52) U.S. Cl.
CPC .............. *H02P 6/24* (2013.01); *H02P 3/14* (2013.01); *H02P 3/18* (2013.01); *H02P 6/182* (2013.01)

(58) Field of Classification Search
CPC ................. H02P 6/24; H02P 3/14; H02P 3/18
USPC ........................................ 318/400.09, 254.1
See application file for complete search history.

(56) References Cited

U.S. PATENT DOCUMENTS

| | | | | |
|---|---|---|---|---|
| 7,211,973 B1 * | 5/2007 | Hoo | ....................... | G11B 21/12 318/400.34 |
| 2004/0041530 A1 * | 3/2004 | Peterson | ................... | H02P 1/18 318/400.01 |

* cited by examiner

*Primary Examiner* — Erick Glass
(74) *Attorney, Agent, or Firm* — Lawrence J. Bassuk; Charles A. Brill; Frank D. Cimino

(57) ABSTRACT

A circuit includes a driver circuit having a high side switch device and a low side switch device coupled to a load voltage node and a motor winding output. A controller operates the high side switch device and the low side switch device. The controller operates in a normal mode to supply current to the motor winding output for driving a motor winding when an external power supply is available to supply the load voltage node. In response to detecting a loss of the external power supply, the controller operates the high side switch device and the low side switch device in a boost mode to utilize a back electromotive force (BEMF) voltage from the motor winding to supply current to the load voltage node.

17 Claims, 10 Drawing Sheets

CONFIGURATION, FREQUENCY REGISTERS GENERATING POWER FROM MOTOR IN SUPPLY-LOSS EVENT

CROSS-REFERENCE TO RELATED APPLICATION

This application claims the benefit of U.S. Provisional Patent Application 62/113,618 filed on Feb. 9, 2015, and entitled METHOD TO GENERATE POWER FROM BLDC MOTOR IN SUPPLY-LOSS EVENT, the entirety of which is incorporated by reference herein.

TECHNICAL FIELD

This disclosure relates to motor control and more particularly to a controller that generates power from a motor during a supply-loss event.

BACKGROUND

A typical brushless direct current (DC) motor has permanent magnets which rotate around a fixed armature, eliminating problems associated with connecting current to the moving armature. The controller performs timed power distribution from a fixed power supply to the motor by using a solid-state switching circuit to pulse voltage to the respective phases of the motor. In certain applications, such as for use in hard disk drives, for example, the fixed power supply voltage can be lost at any moment due to a power loss event such as shutdown of the main computer utilizing the disk drive. If power is lost, the controller has to back-power the electronics on the disk drive from the motor kinetic energy. In some systems, three phase alternating current back electromotive force (BEMF) voltages from the motor are rectified to supply enough power to allow orderly shutdown of the disk drive. As system demands require smaller hard drive form factors and lower cost motors, which have less winding turns, current approaches to back power electronics for motors may be inadequate.

SUMMARY

This disclosure relates to a controller that generates power from a motor during a supply-loss event by operating the motor as a boost regulator over selected periods of the event.

In one example, a circuit includes a driver circuit having a high side switch device and a low side switch device coupled to a load voltage node and a motor winding output. A controller operates the high side switch device and the low side switch device. The controller operates in a normal mode to supply current to the motor winding output for driving a motor winding when an external power supply is available to supply the load voltage node. In response to detecting a loss of the external power supply, the controller operates the high side switch device and the low side switch device in a boost mode to utilize a back electromotive force (BEMF) voltage from the motor winding to supply current to the load voltage node.

In another example, a system includes a driver circuit having a plurality of switch devices coupled to a load voltage input and a plurality of motor winding outputs. An isolation switch couples an external supply voltage to the load voltage during a normal mode and decouples the external supply voltage from the load voltage during a supply-loss event of the external supply voltage. A controller operates the plurality of switch devices and the isolation switch. The controller operates in the normal mode to supply current to the plurality of motor winding outputs for driving a plurality of motor windings when the external power supply is available to supply the load voltage. In response to detecting a loss of the external power supply, the controller decouples the external supply voltage via the isolation switch and operates the plurality of switch devices in a boost mode to utilize a back electromotive force (BEMF) voltage from the motor windings to supply current to the load voltage. The boost mode controls a duty cycle of switch pulses applied to the plurality of switch devices to boost the load voltage after the supply-loss event.

In yet another example, a method includes controlling at least one switch device to supply electrical power to windings of a motor from an external supply in a normal mode when the external supply is present to supply the electrical power for the motor and a load. The method includes monitoring the electrical power for a supply-loss event. In response to detecting the supply-loss event, the method includes controlling a duty cycle of the at least one switch device to operate the windings of the motor in a boost mode using electrical power from the windings of the motor to control the electrical power during a selected portion of the supply-loss event.

DETAILED DESCRIPTION

This disclosure relates to a controller that generates power from a motor during a supply-loss event by operating the motor as a boost regulator over selected periods of the event. The motor can be employed to operate a hard disk drive, for example. In one example, a circuit includes a driver circuit having one or more switch devices coupled to a load voltage input to the motor and a motor winding output. As one example, the driver circuit can control three phases of a brushless direct current motor where separate low and high side switches are provided to pulse voltages to each phase. A controller operates the respective high side switch and the low side switches of each phase. The controller operates in a normal mode to supply current to the motor winding output for driving motor windings when an external power supply is available to supply the load voltage. The load voltage is coupled to provide both the voltage to drive the motor and to power system electronics for operating the disk drive. In response to detecting a loss of the external power supply, the controller operates the switch devices for each phase in a boost mode to utilize a back electromotive force (BEMF) voltage from the motor winding to supply current to the load voltage.

During boost mode, the controller and driver circuit can control electrical power transfer from the motor windings to the power supply input, such as to supply an increased load voltage (e.g., controlled decreasing slope) over conventional synchronous rectification. In some examples, the motor is a three phase voltage source. By using the inductance of the motor windings and controlling the switch devices synchronized with respect to motor BEMF voltage, the driver circuit and windings can operate as a boost regulator to increase the remaining operating time. The additional operating time can enable an orderly shutdown of the drive by sustaining the load voltage.

In some examples, the load voltage and/or boost current can be measured, and the load voltage tuned via the controller by adjusting the switching duty cycle based on the load voltage to maximize the output power transfer and thereby maximize the load voltage. This can include monitoring the load voltage (and/or motor current) and adjusting the duty cycle to store and dump the electrical energy from the spinning motor. Other parameters, such as modulation frequency, can also be controlled. Since there can be an efficiency loss in the boost stage when the load voltage impedance is the same as the spindle motor phase resistance (or less), a more efficient method for supplying the load voltage is synchronous rectification. The controller can automatically sense this voltage condition and switch from boost mode to a synchronous rectification mode seamlessly based on the measured load voltage and/or motor current.

Figure 1:
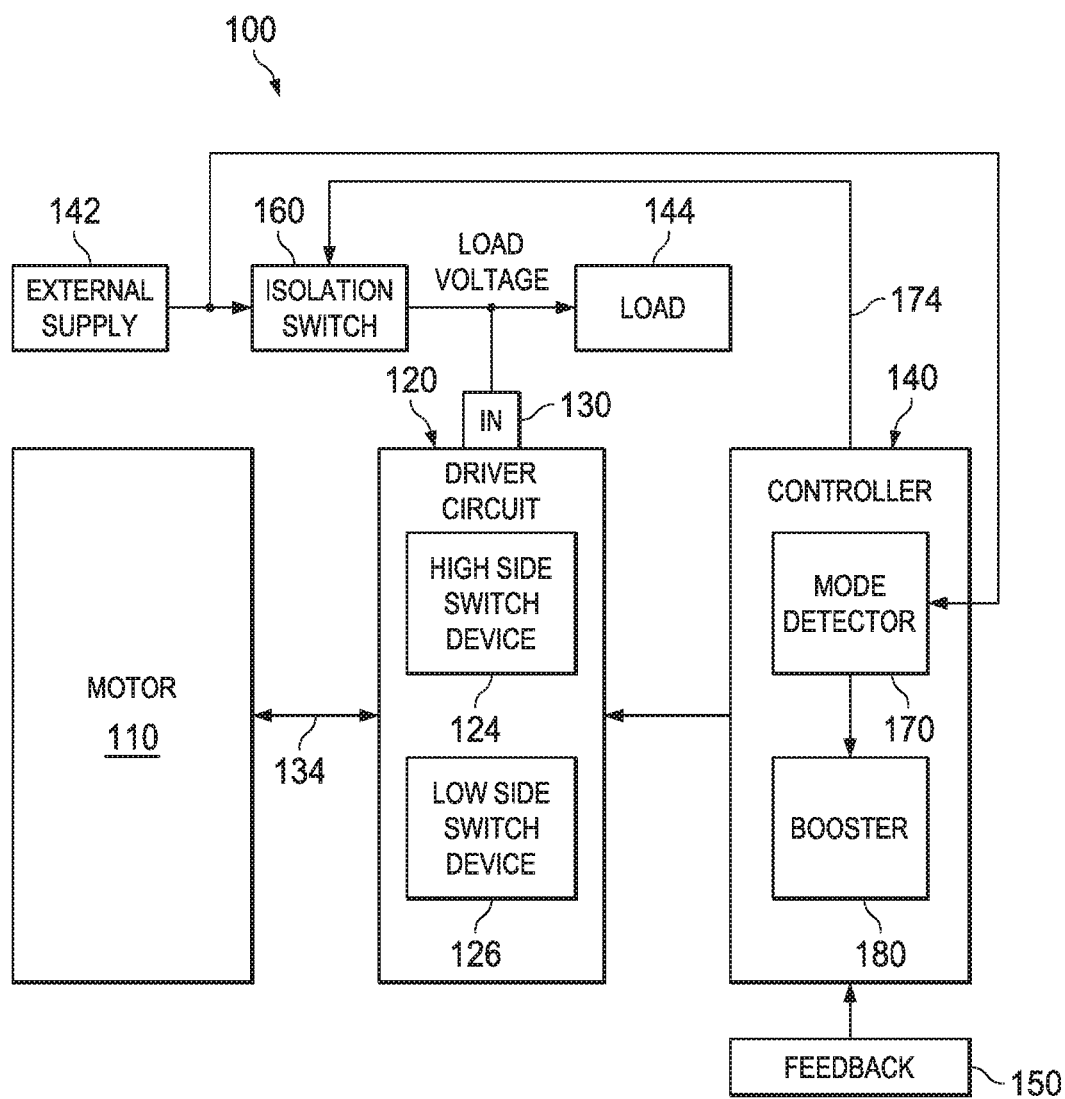
FIG. 1 illustrates an example block diagram of a circuit to generate power from a motor during a supply-loss event.

FIG. 1 illustrates an example block diagram of a circuit 100 to generate power from a motor 110 during a supply-loss event. As used herein, the term circuit can include a collection of active and/or passive elements that perform a circuit function such as an analog circuit or control circuit, for example. Additionally or alternatively, the term circuit can include an integrated circuit where all the circuit elements are fabricated on a common substrate, for example. The circuit 100 includes a driver circuit 120 having one or more switch devices 124 and 126 coupled to a voltage input 130 and a motor winding output 132. In the example of FIG. 1, the driver circuit 120 is demonstrated as including a high side switch device 124 and a low side switch device 126. Although a single phase is described for purposes of explanation, the driver circuit 120 can control three phases of a brushless direct current (BLDC) motor 110, for example, where separate low and high side switch devices are provided to supply electrical power to each phase (See, e.g., FIG. 3).

A controller 140 operates the high side switch 124 and the low side switch 126 of each respective phase. The controller 140 operates in a normal mode to supply current to a motor winding output 134 for driving motor windings when an external power supply shown 142 is available to supply the electrical power for the motor 110 at a load voltage node. The load voltage node is coupled to supply load voltage to a load 144 and to the input 130 of the drive circuit 120. As used herein, the term normal mode refers to when the external supply 142 is available and operating to supply the load voltage to both the motor 110 and the load 144. The load voltage supplied from the external supply 142 provides electrical power to drive the motor 110 and to drive system electronics, shown as the load 144. In some examples, the load 144 can include disk drive electronic circuits (e.g., memory storage and retrieval circuits) and the motor can be a spindle motor.

In response to detecting a loss of the external power supply 142, the controller 140 operates the high side switch 124 and the low side switch 126 for each phase in a boost mode to utilize a back electromotive force (BEMF) voltage from the motor winding of the motor 110 to supply current to the load voltage. As used herein, the term boost mode refers to an operating mode that occurs when the load voltage from the external supply 142 is unavailable or has fallen below a predetermined threshold. In the boost mode, the controller 140 and driver circuit 120 operate the motor 110 as a boost regulator circuit to maintain the load voltage. For example, in response to detecting a supply-loss event, the controller 140 operates the driver circuit 120 to convert electrical power (i.e., BEMF voltage) from the windings of the motor to increase the load voltage at the input 130 to the driver circuit. In the example where the circuit 100 is a disk drive system, the increased voltage supplied from the BEMF to the input 130 during the supply-loss event can be employed to assist in orderly shutdown of the disk drive (e.g., corresponding to the load 144 electrically coupled to the input 130).

The controller 140 can receive feedback 150 to control operations during the normal mode and the boost mode. The feedback 150 can include voltage feedback from the load voltage and/or current feedback from the motor 110 to operate the high side switch 124 and the low side switch 126 in the boost mode. The controller 140 can also operate an isolation switch 160 to electrically disconnect the external supply voltage in response to detecting the loss of the external power supply 142. The controller 140 includes a mode detector 170 that generates a power supply loss signal 174 if the external power supply falls below a predetermined threshold. The power supply loss signal 174 is employed to control the isolation switch 160 and to switch the controller 140 into the boost mode. For example, in the boost mode, a booster 180 operates the switches to maximize the load voltage when the external supply 142 has been lost. The booster 180 can operate various switching and duty cycle parameters to control the switches 124 and 126 while in boost mode during a supply-loss event. For example, as the load voltage drops, the duty cycle to the switches 124 and 126 can be altered to boost the load voltage by maximizing power transfer between the motor 110 and the load 144. As will be described below, as the load voltage drops below a predetermined threshold, the controller 140 can automatically switch from the boost mode to synchronous rectification mode to facilitate efficient power transfer from the motor 110 to the load 144.

Figure 10:
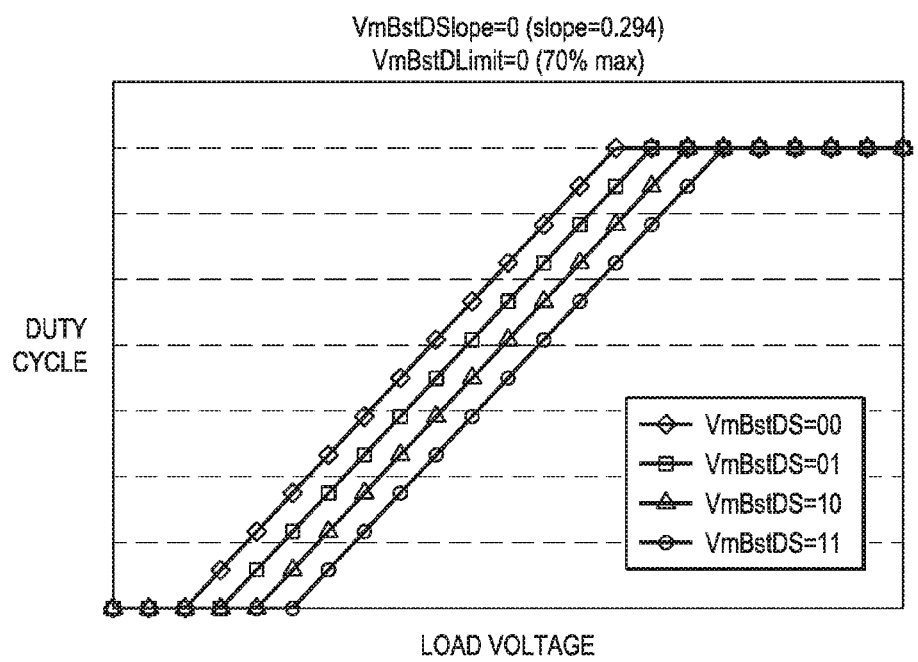
FIGS. 10 and 11 illustrate example slope selection curves specified by a configuration register to control duty cycle switching.

The controller 140 can include a configuration register employed by the booster 180 to control the switching of the high side switch 124 and the low side switch 126 (See e.g., FIG. 10). This can include configuration parameters that define the slope of the load voltage with respect to the duty cycle applied to the driver circuit 120, the pulse width modulated frequency applied, the duty cycle with respect to a given magnitude of the load voltage and the maximum duty cycle for example. As used herein, the term slope of the load voltage refers to the decreasing value of the load voltage over time after the external supply-loss event. As used herein, the term duty cycle refers to a ratio of the on-time of pulses applied to a respective switch 124 or 126 with respect to the pulse off time. The duty cycle may also refer to the ratio of on-time versus off-time of the switch devices 124 and 126.

A phase detector (See e.g., FIG. 3) can be provided in the controller 140 to detect the polarity of the BEMF voltage such that the controller applies pulses to the high side switch 124 and the low side switch 126 during a positive voltage period of the BEMF voltage. Duty cycle pulsing is not performed during negative periods of the BEMF for a given winding to mitigate diverting power from the motor to the load 144. Instead, the controller 140 synchronizes operation of the switch devices 124 and 126 in the driver circuit 120 so that the BEMF from motor windings increases the load voltage during the supply-loss event.

Figure 2:
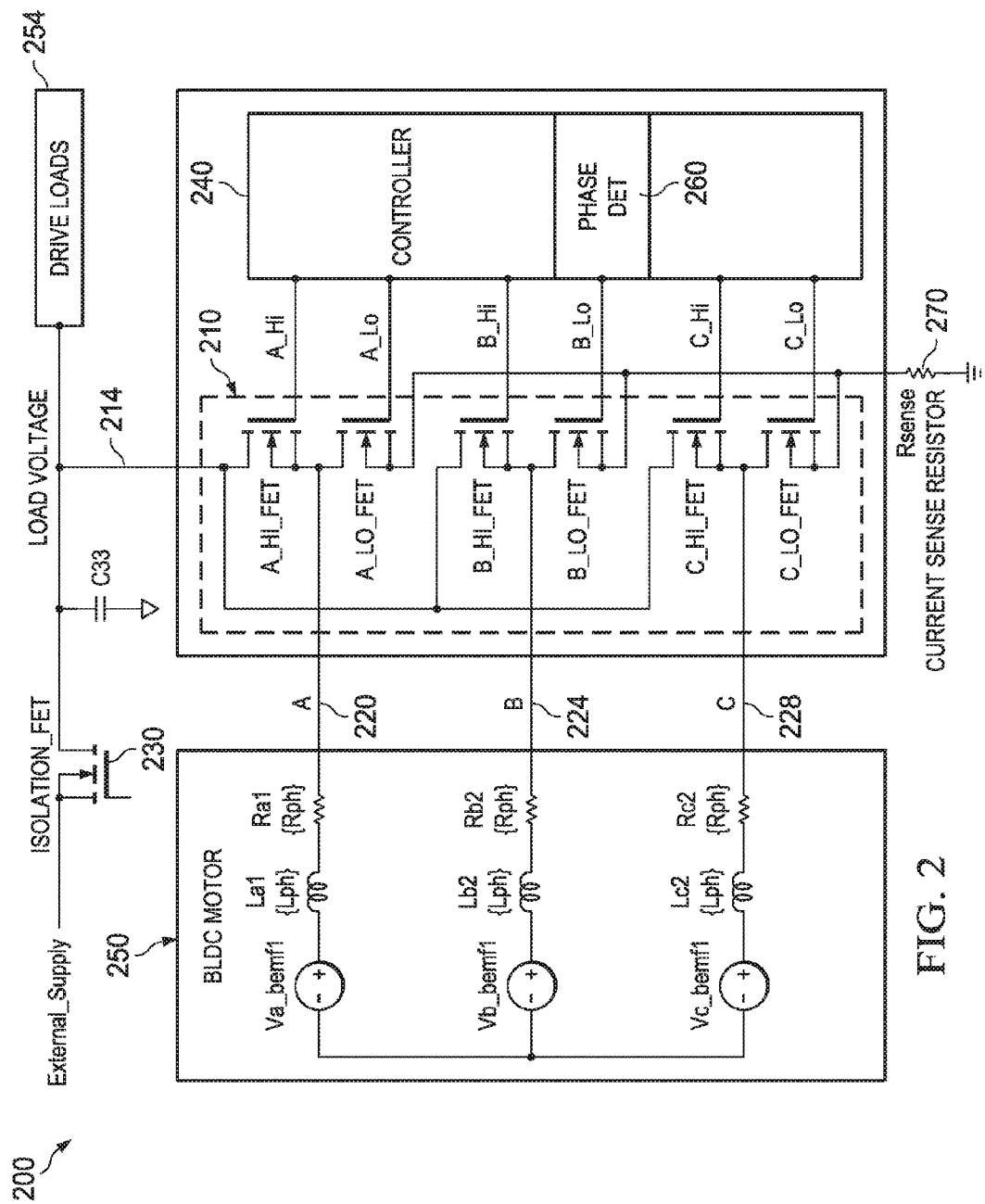
FIG. 2 illustrates an example block diagram of a system to generate power from a motor during a supply-loss event.

FIG. 2 illustrates an example of a system 200 to generate power from a motor during a supply-loss event. The system 200 includes a driver circuit 210 having a plurality of switch devices (e.g., FET transistor devices) coupled to a load voltage input 214 and a plurality of motor winding outputs 220, 224, and 228. An isolation switch 230 couples an external supply voltage to the load voltage during a normal mode and decouples the external supply voltage from the load voltage during a supply-loss event of the external supply voltage. A controller 240 operates the plurality of switch devices in the driver circuit 210 and the isolation switch 230. The controller 240 operates in the normal mode to supply current to the plurality of motor winding outputs 220-228 for driving a plurality of motor windings of a motor 250 when the external power supply is available to supply the load voltage to a load 254. Each phase of the motor 250 is modeled as a series resistance, a series inductance, and a BEMF voltage that is generated in each phase when the motor is spinning.

In response to detecting a loss of the external power supply, the controller 240 decouples the external supply voltage via the isolation switch 230 and operates the plurality of switches in the driver circuit 210 in a boost mode to utilize a BEMF voltage from the motor windings to supply electrical power to the load voltage. As mentioned, the boost mode controls a duty cycle of switch pulses applied to operate the plurality of switch devices to boost the load voltage after the supply-loss event. The boost mode operates the motor 250 as a boost regulator changing the pulsing duty cycle to the driver circuit as the load voltage drops in order to maximize power transfer from the motor to the load voltage. This in turn causes the load voltage to more gradually decrease than other possible approaches that do not utilize such a boost mode.

A phase detector 260 notifies the controller 240 about the polarity of the BEMF signals detected for each respective phase winding of the motor 250. The controller 240 operates the driver circuit 210 in boost mode for a given winding during positive polarity of the BEMF for the given winding. The controller 240 disables the pulsing of the driver circuit in the boost mode for each of the windings during its negative BEMF. As an example, the phase detector 260 can implement zero crossing techniques to trigger off the zero crossing of the respective BEMF signals for each respective winding to determine the polarity thereof. Various signal drawings are provided in FIGS. 4-12 that illustrate the various modes, switching, and duty cycle changes described herein. As shown in FIG. 2, a current sense resistor 270 can provide current feedback from the motor 250, and the controller 240 can employ the current feedback to adjust the duty cycle during the boost mode. Alternatively or additionally, the controller 240 can monitor the load voltage as feedback (e.g., via internal A/D converter) and utilize the magnitude of the load voltage to control the duty cycle for each respective driver circuit 210. For example, the controller 240 can utilize the load voltage to determine when and at what levels to alter the switching duty cycle applied to each driver circuit 210.

As a further example, motor power (e.g., BEMF) can be transferred from the motor to a capacitor C33 as the controller 240 is operating in boost mode. When the low side switches as described herein are turned on, power is being stored in the motor via current paths from the low side switches through the sense resistor 270. When the high side switches in the driver circuit 210 are turned on, the stored energy from the motor 250 is transferred to C33 to boost the voltage level at C33 from the BEMF and stored energy of the motor. As noted previously, when the load voltage drops below a predetermined threshold value which can be programmed (e.g., in response to a user input), the controller 240 can control the switches in the driver circuit 210 to cause synchronous rectification mode (e.g., full or half wave rectification) to deliver electrical current to charge C33 and thereby help to maintain the load voltage in the absence of the voltage from the external supply. This provides more efficient power conversion of the motor energy at lower levels of the load voltage than via boost mode.

Figure 3:
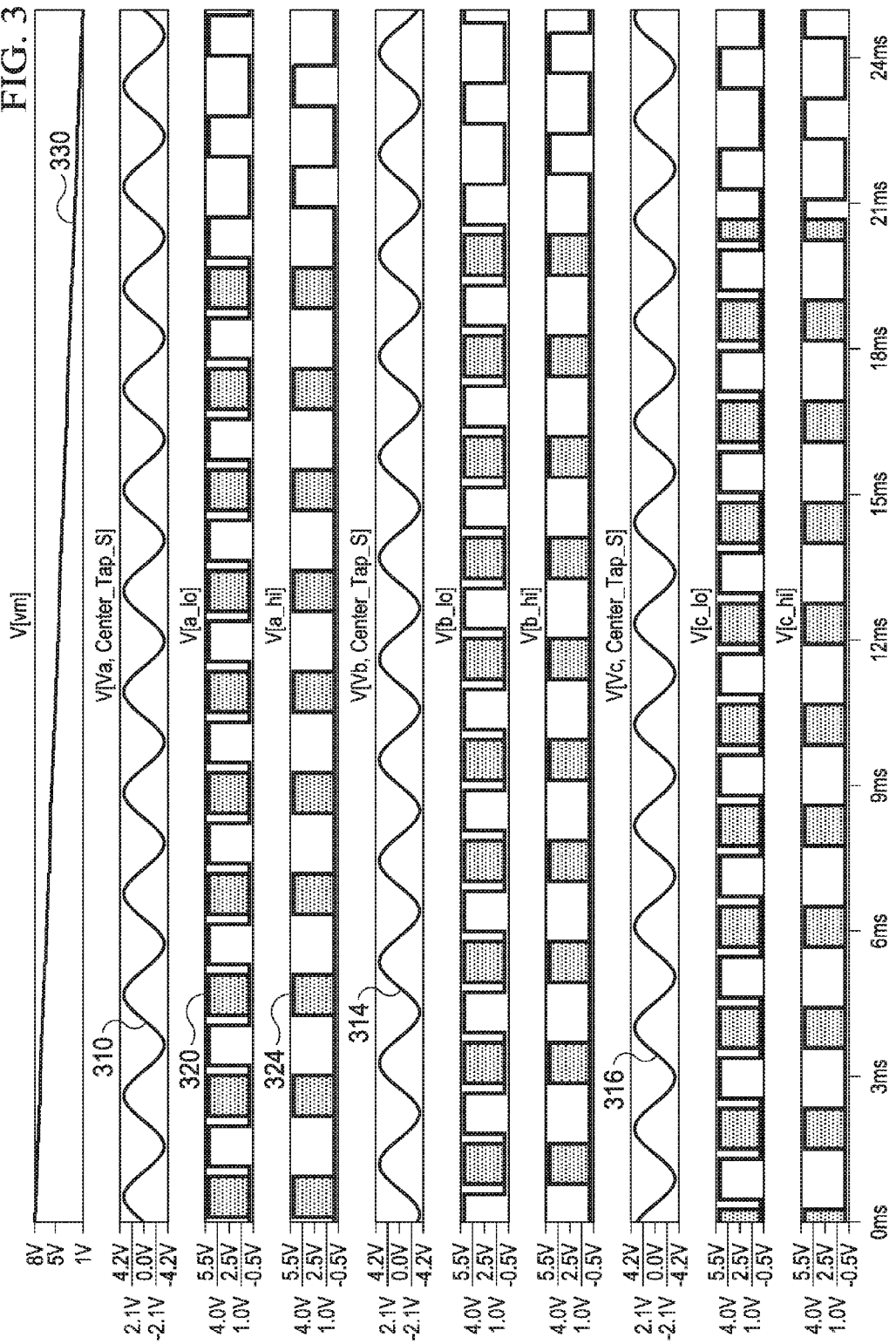
FIG. 3 illustrates an example three phase diagram depicting pulse width modulation for boost mode over an extended time frame.

FIG. 3 illustrates an example three phase diagram depicting pulse width modulation for boost mode over an extended time frame. Three BEMF voltages are shown at 310, 314, and 316 where voltage is depicted on the vertical axis of the diagram and time is represented on the horizontal axis. During the positive half BEMF cycle of each voltage phase, the motor is operated in boost mode as described herein. As shown at 320 and 324, for example, PWM signals are applied to the motor windings via the driver switch devices described herein. The time scale is extended to show the overall operation of the motor during boost mode. Other figures disclosed herein show more granular time detail of the pulse width modulation versus the load voltage. By operating each phase in boost mode using the BEMF as a power source during the supply-loss event, the load voltage shown at 330 decreases more gradually than if only rectification was employed.

Figure 4:
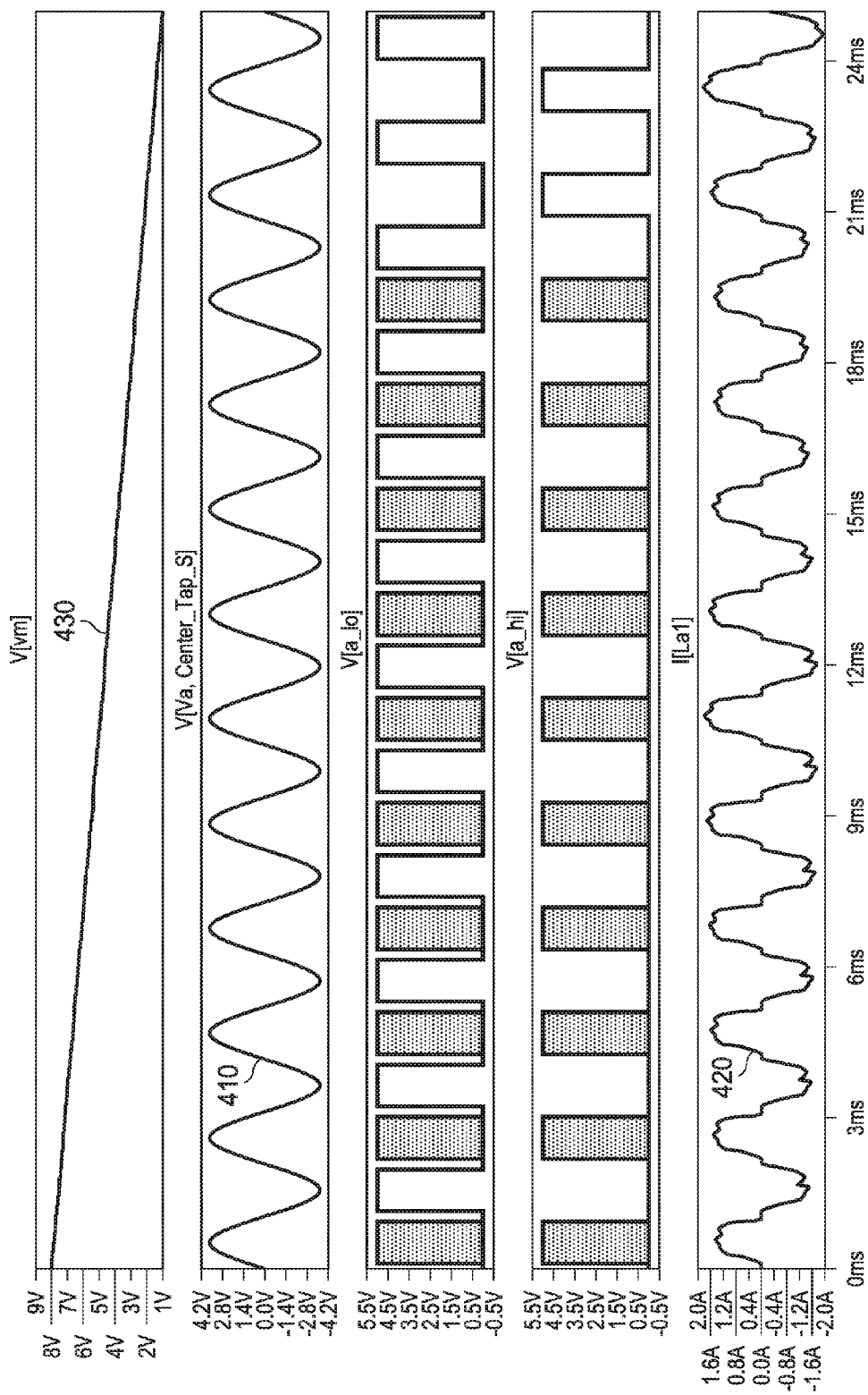
FIG. 4 illustrates an example single phase diagram depicting pulse width modulation for boost mode over an extended time frame.

FIG. 4 illustrates an example single phase diagram depicting pulse width modulation for boost mode over an extended time frame. In this example, boost mode is shown with respect to a single phase where pulse width modulation during boost mode is shown during positive half peaks of the BEMF voltage. The example waveform 410 represents a clean-modeled version of the BEMF and waveform 420 represents a more real-world model of BEMF with associated motor noise. The load voltage is shown at 430 as exhibiting a gradual decrease in value over time during boost mode. The following examples of signal diagrams depict details of the pulse width modulation versus load voltage at more granular time scales.

Figure 5:
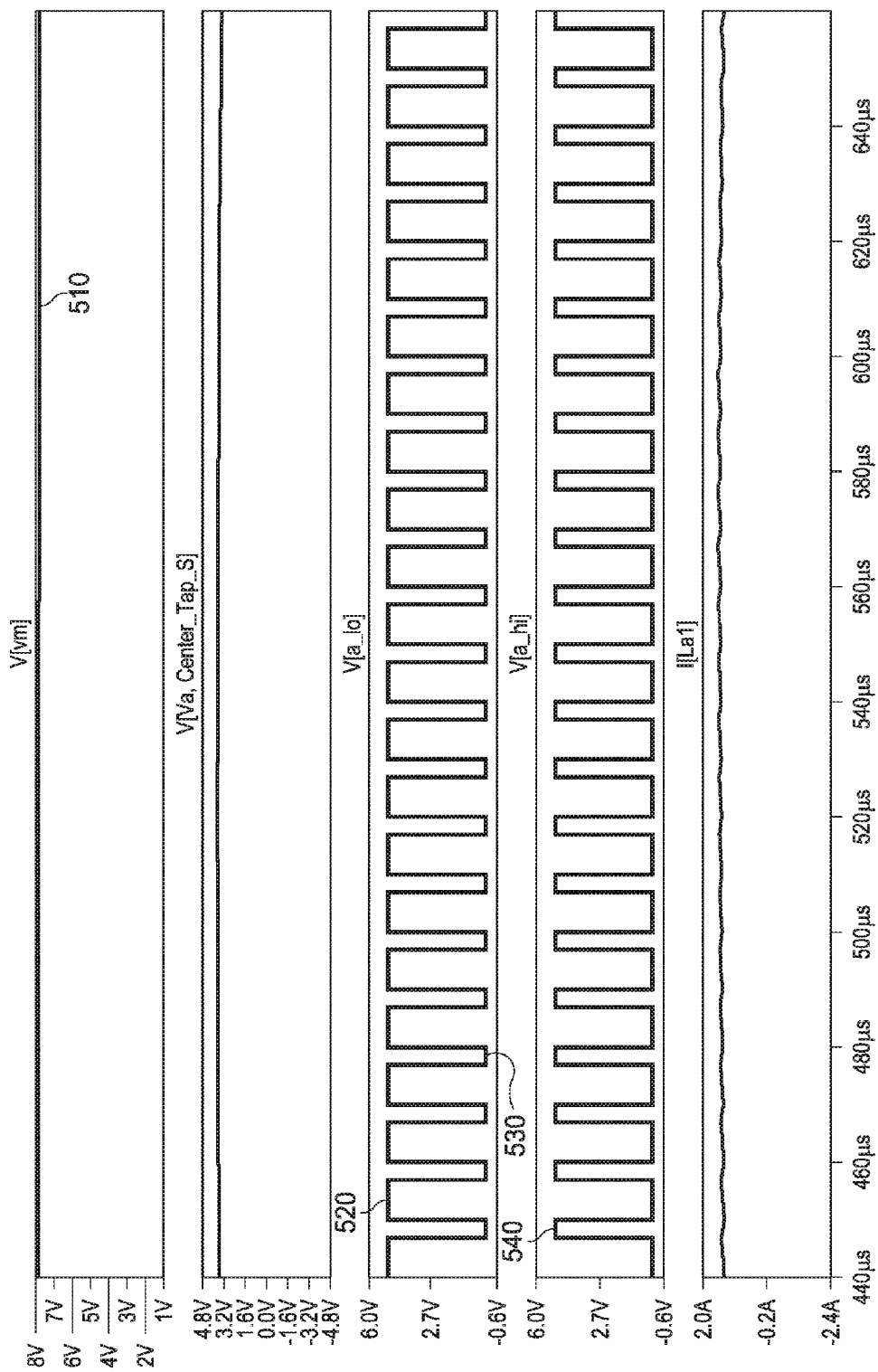
FIG. 5 illustrates an example single phase diagram depicting pulse width modulation for boost mode at a maximum duty cycle for boost mode.

FIG. 5 illustrates an example single phase diagram depicting pulse width modulation for boost mode at a maximum duty cycle for boost mode. In this example, the load voltage is near its maximum value in this particular motor example of about 8 volts. At that value, the duty cycle is at its maximum where the low side switch on time at 520 is longer than the low side switch off time at 530. The high side duty cycle is opposite the low side duty cycle as shown at 540. Thus, at higher values of load voltage, the duty cycle applied to the low side switch is at maximum causing maximum amounts of energy to be stored in the motor winding. When the high side switch is active and low side switch inactive, energy is transferred from the motor to supply the load voltage.

Figure 6:
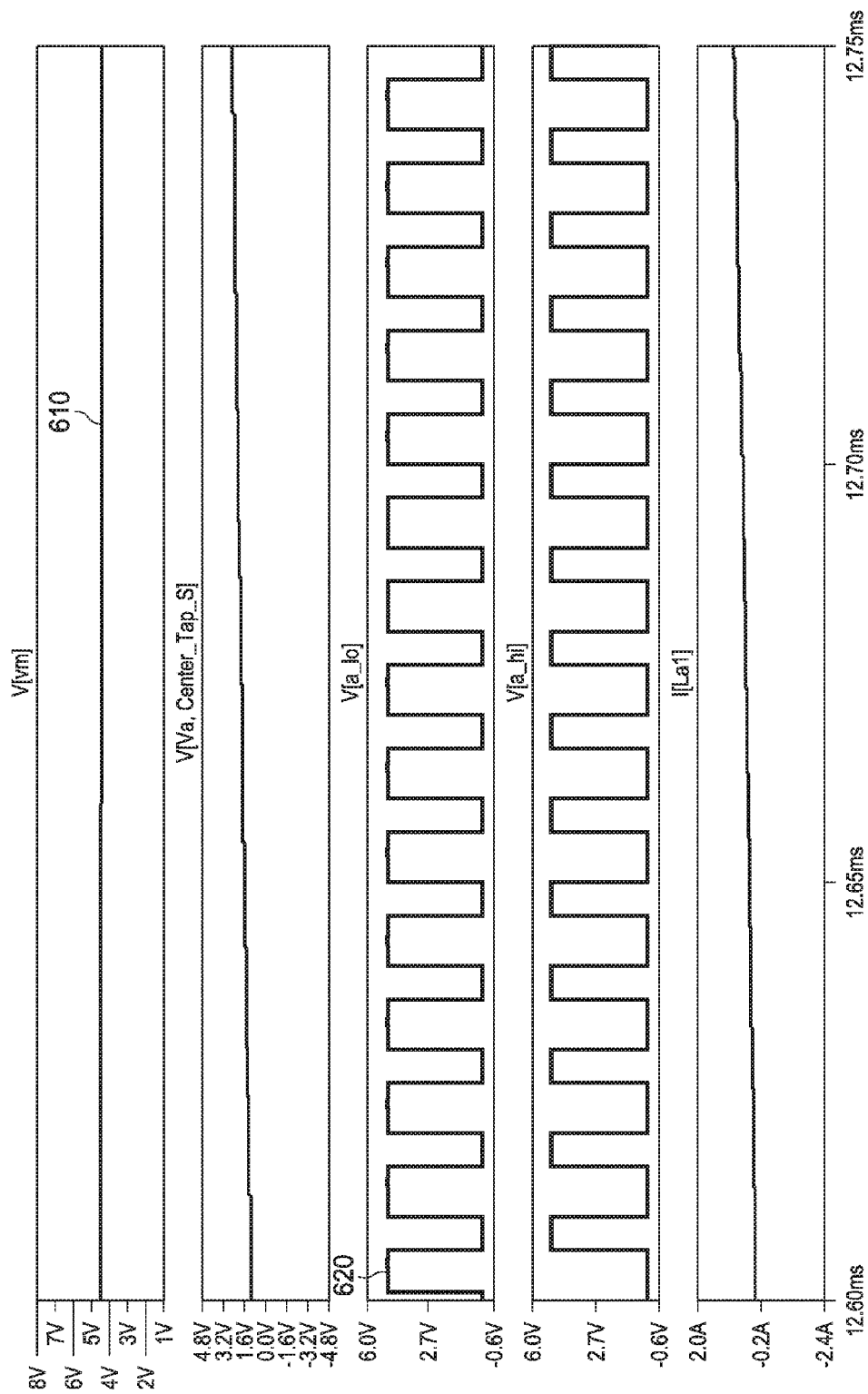
FIG. 6 illustrates an example single phase diagram depicting pulse width modulation for boost mode at a reduced duty cycle for boost mode at a lower level of load voltage.

FIG. 6 illustrates an example single phase diagram depicting pulse width modulation for boost mode at a reduced duty cycle for boost mode at a lower level of load voltage. In this example, the load voltage has gradually reduced to a value of about 4.5 volts as shown at 610. As such, the duty cycle has changed (e.g., by controller) to where the on time of the low side switch pulse at 620 is less than at higher levels of the load voltage depicted in FIG. 5 at 520.

Figure 7:
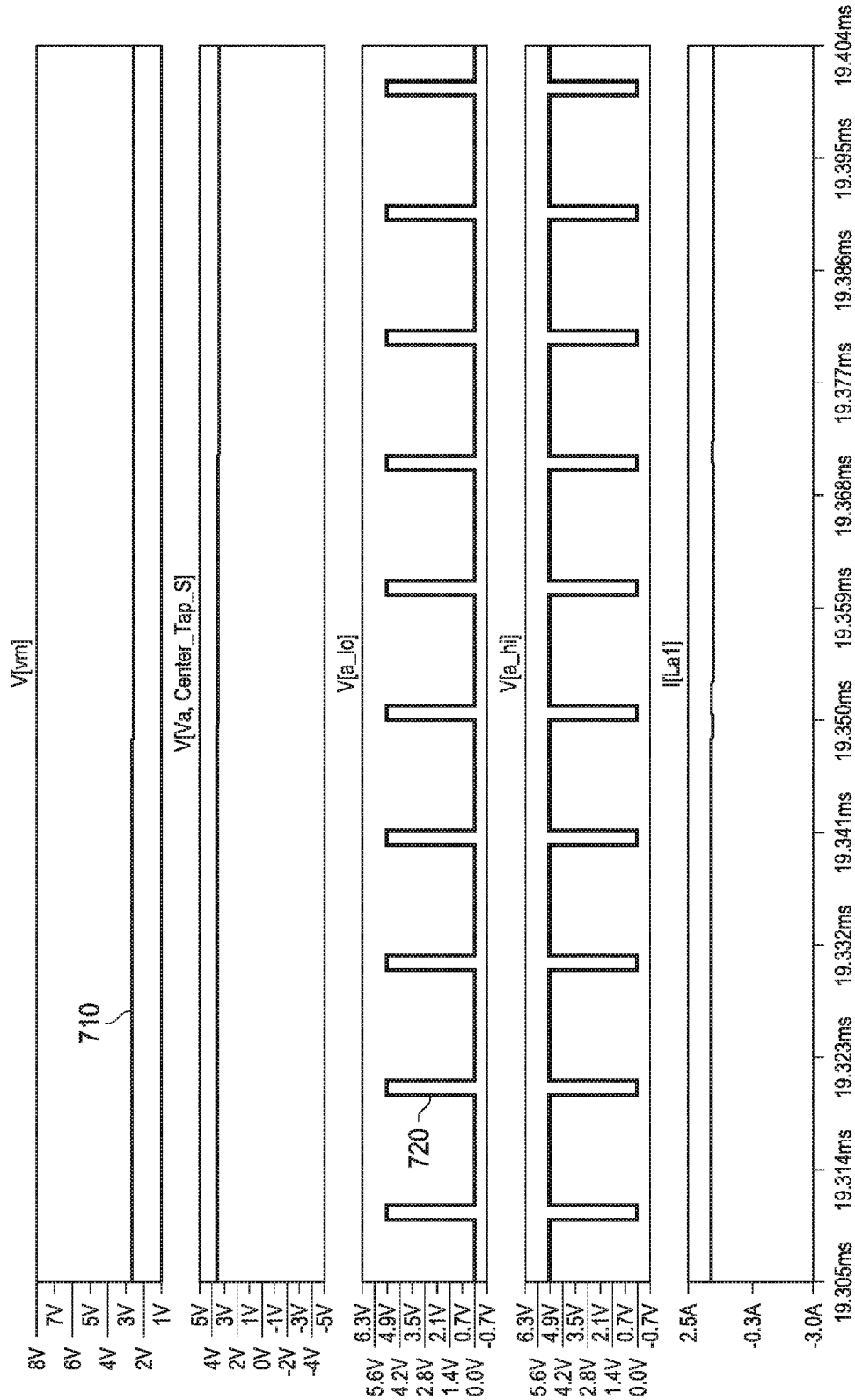
FIG. 7 illustrates an example single phase diagram depicting pulse width modulation for boost mode at a minimum duty cycle for boost mode at a minimum threshold level of load voltage.

FIG. 7 illustrates an example single phase diagram depicting pulse width modulation for boost mode at a minimum duty cycle for boost mode at a minimum threshold level of load voltage. In this example, the load voltage has gradually reduced to a value of about 2.5 volts as shown at 710. Accordingly, the duty cycle has changed to where the on time of the low side switch pulse at 720 is less than at higher levels of the load voltage such as depicted in FIG. 6 at 620.

Figure 8:
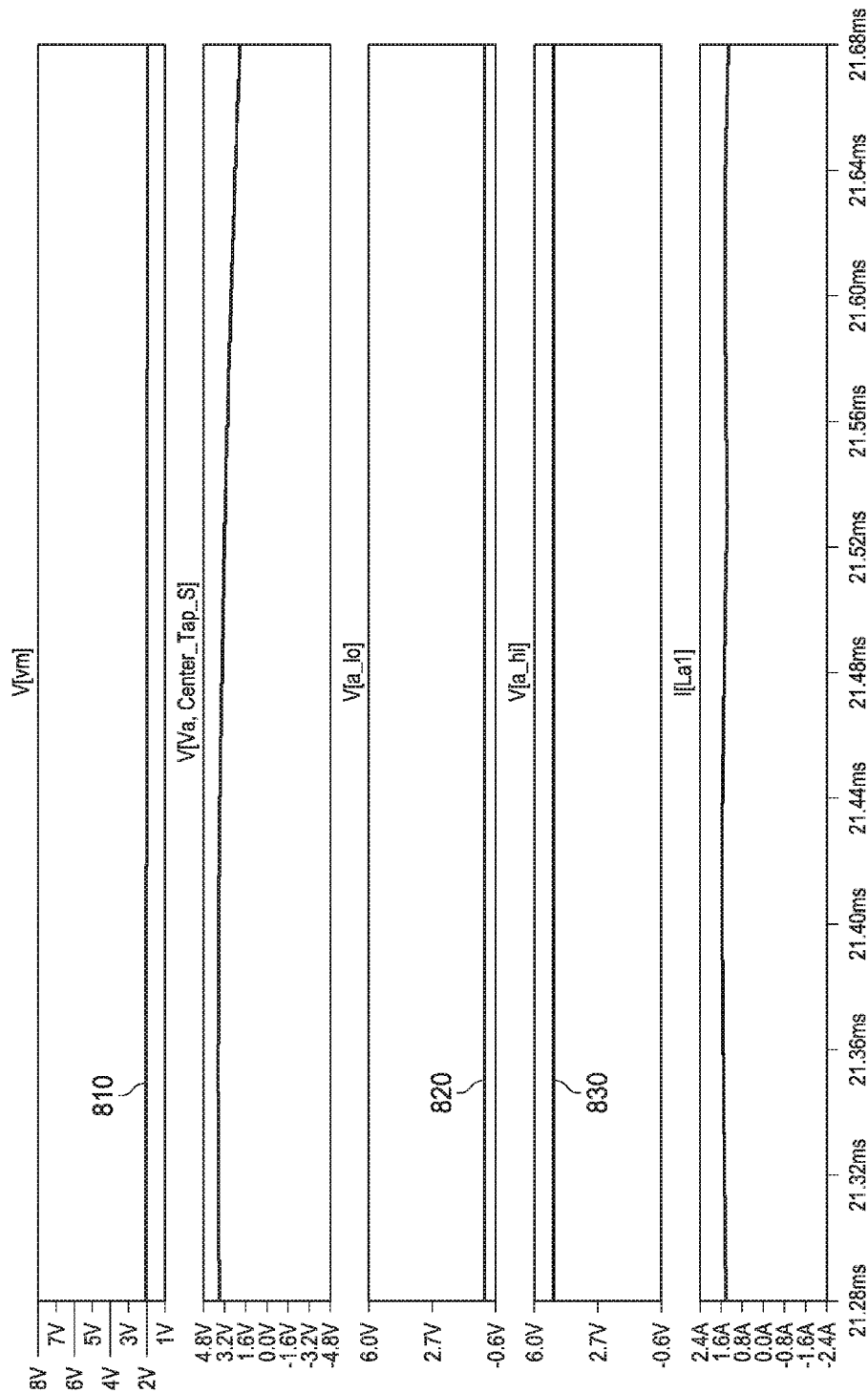
FIG. 8 illustrates an example single phase diagram depicting pulse width modulation for rectification mode at a duty cycle below a minimum threshold level of load voltage.

FIG. 8 illustrates an example single phase diagram depicting pulse width modulation for rectification mode at a duty cycle below a minimum threshold level of load voltage. As the load voltage drops below a given threshold, the circuits described herein can detect this condition and switch from boost mode to synchronous rectification mode to provide more efficient power transfer from the motor to the load at lower values of the load voltage. As shown in this example, the load voltage at 810 is about 2.0 volts which is below a programmable register threshold described below. At such threshold minimum voltage level, pulsing to the driver switches stops where the low side switches are held off as shown at 820 and the high side switches are held on as shown at 830.

Figure 9:
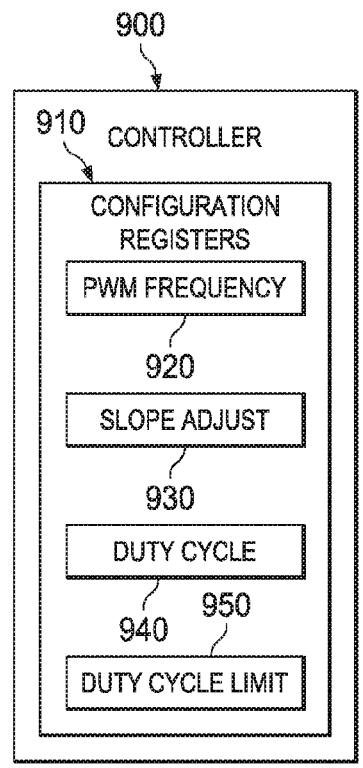
FIG. 9 illustrates an example controller and configuration register for specifying boost mode parameters to control duty cycle switching.
Figure 11:
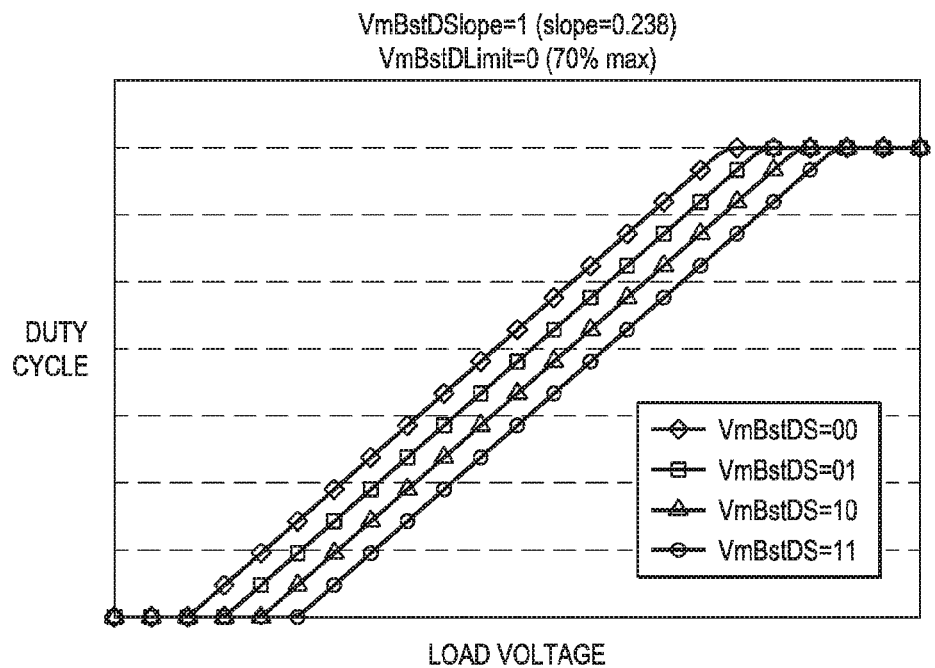
Figure 12:
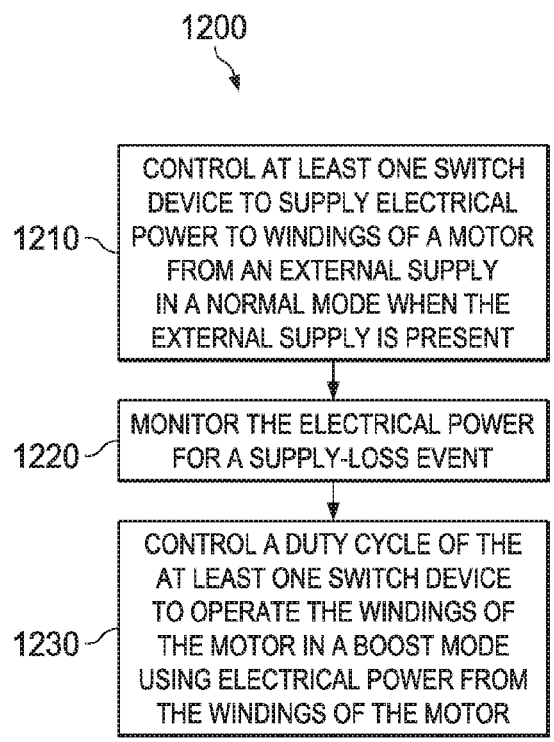
FIG. 12 illustrates a flow diagram depicting a method to generate power from a motor during a supply-loss event.

FIG. 9 illustrates an example controller 900 and configuration register 910 for specifying boost mode parameters to control duty cycle switching during a detected supply-loss event. The configuration register 910 can be accessed via multiple serial port bits to allow for tuning the driver switch device operating parameters described herein. PWM frequency register 920 allows for pulse width modulation (PWM) frequency tuning during boost mode. Settings include 40 kHz or 70 kHz for example, where the frequency is the inverse of the time to complete one high and low transition to the high and low side switch devices respectively. A slope adjust selects a ratio of the duty cycle to the load voltage. Selectable values for the slope adjust include 0.294 or 0.238, for example. FIGS. 11 and 12 illustrate examples at 0.294 and 0.238 respectively.

A duty cycle register 930 specify bit shifts representing the load voltage boost duty cycle. The duty cycle register 930 also determines a load voltage threshold when synchronous rectification is applied to convert BEMF to the load voltage. The following Table 1 demonstrates an example of selectable equations for the relationship between load voltage and the duty cycle.

TABLE 1

| LoadBstDS | Equation |
| --- | --- |
| 00 | Duty Cycle = Slope (Vm-2.0) |
| 01 | Duty Cycle = Slope (Vm-2.2) |

TABLE 1-continued

| LoadBstDS | Equation |
| --- | --- |
| 10 | Duty Cycle = Slope (Vm-2.4) |
| 11 | Duty Cycle = Slope (Vm-2.6) |

Since the boost regulator has zero energy transfer with 100% duty cycle, the duty cycle limit at 950 selects the maximum allowed duty cycle. Other example duty cycle limits include 70% and 75%.

FIGS. 10 and 11 illustrate example slope selection curves specified by a configuration register to control duty cycle switching. Load voltage is shown on the horizontal axis versus duty cycle on the vertical axis of each diagram. FIG. 10 provides a graphical diagram of the relationship between load voltage and duty cycle when the slope is selected at 0.294 as described above with respect to FIG. 9 via the slope adjust 930. FIG. 12 provides a graphical diagram of the relationship between load voltage and duty cycle when the slope is selected at 0.238 as described above with respect to FIG. 9 via the slope adjust 930. The load voltage can be measured and the duty cycle can be updated on each PWM cycle. Both FIGS. 10 and 11 shows that as the load voltage reduces, the duty cycle can decrease to zero. When the duty cycle goes to zero, the circuit is then performing synchronous rectification.

In view of the foregoing structural and functional features described above, an example method will be better appreciated with reference to FIG. 13. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an IC, controller, or a processor, for example.

FIG. 12 illustrates a method 1200 to generate power from a motor during a supply-loss event. At 1210, the method 1200 includes controlling at least one switch device to supply electrical power to windings of a motor from an external supply in a normal mode when the external supply is present to supply the electrical power for the motor and a load (e.g., via controller 140 and driver circuit 120 of FIG. 1). At 1220, the method 1200 includes monitoring the electrical power for a supply-loss event (e.g., via mode detector 170 of FIG. 1). At 1230, in response to detecting the supply-loss event, the method 1200 includes controlling a duty cycle of the at least one switch device to operate the windings of the motor in a boost mode using electrical power from the windings of the motor to control the electrical power during a selected portion of the supply-loss event (e.g., via controller 140 and booster 180 of FIG. 1). Although not shown, in response to the external supply reaching a predetermined threshold during the supply-loss event, the method 1200 can include specifying a load voltage value where the boost mode terminates and initiating synchronous rectification of a back electromotive force (BEMF) voltage from the motor to drive the load. The method 1200 can also include changing a duty cycle of the at least one switch device based on current feedback received from the motor during the supply-loss event. The method 1200 can also include monitoring the peak current of the motor (e.g., via a current sense resistor or a sense transistor device in series with the motor) and controlling the duty cycle such that the output current from the motor is about one half of the monitored peak current. The peak current can be determined by turning on all low side switch devices (e.g., FET's) described herein and monitoring the current, for example.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit comprising:
   a driver circuit having a high side switch device and a low side switch device coupled to a load voltage node and a motor winding output; and
   a controller to operate the high side switch device and the low side switch device, the controller operates in a normal mode to supply current to the motor winding output for driving a motor winding when an external power supply is available to supply electrical power to the load voltage node;
   in response to detecting a loss of the external power supply, the controller operates the high side switch device and the low side switch device in a boost mode to utilize a back electromotive force (BEMF) voltage from the motor winding to supply current to the load voltage node; and
   the controller including a configuration register to control the switching of the high side switch device and the low side switch device, the configuration register including a frequency register to control the pulse width modulated frequency applied to the high side switch device and the low side switch device.

2. The circuit of claim 1, in which the controller receives voltage feedback from the load voltage node or current feedback from the motor to operate the low side switch device and the high side switch device in the boost mode.

3. The circuit of claim 1, including an isolation switch operated by the controller to disconnect the external power supply from the load voltage node in response to detecting the loss of the external power supply.

4. The circuit of claim 3, in which the controller includes a mode detector that generates a power supply loss signal if the external power supply falls below a predetermined threshold, the power supply loss signal employed to control the isolation switch and to switch the controller into the boost mode.

5. The circuit of claim 1, in which the configuration register includes a slope register to select a slope of voltage at the load voltage node with respect to a duty cycle of the high side switch device and the low side switch device.

6. The circuit of claim 1, in which the configuration register includes a duty cycle register to select a duty cycle of the high side switch device and the low side switch device based on the magnitude of the voltage at the load voltage node.

7. The circuit of claim 6, in which the duty cycle register specifies a load voltage value where the boost mode terminates and synchronous rectification is provided by the high side switch device and the low side switch device to drive the load voltage node.

8. The circuit of claim 6, in which the configuration register includes a maximum duty cycle register to specify a maximum duty cycle of pulses applied to the high side switch device and the low side switch device during the boost mode.

9. The circuit of claim 1, including a phase detector to detect the polarity of the BEMF voltage such that the controller applies pulses to the high side switch device and the low side switch device during a positive voltage period of the BEMF voltage.

10. A system comprising:
    a driver circuit having a plurality of switch devices coupled to a load voltage input and a plurality of motor winding outputs;
    an isolation switch to couple an external supply voltage to the load voltage input during a normal mode and to decouple the external supply voltage from the load voltage input during a supply-loss event of the external supply voltage;
    a controller to operate the plurality of switch devices and the isolation switch, the controller operates in the normal mode to supply current to the plurality of motor winding outputs for driving a plurality of motor windings when the external supply voltage is available to supply electrical power to the load voltage input, in response to detecting a loss of the external supply voltage, the controller decouples the external supply voltage via the isolation switch and operates the plurality of switch devices in a boost mode to utilize a back electromotive force (BEMF) voltage from the motor windings to supply current to the load voltage input, the boost mode controlling a duty cycle of switch pulses applied to the plurality of switch devices to boost the load voltage input after the supply-loss event; and
    the controller including a configuration register to control the switching of the plurality of switch devices, the configuration register including a frequency register to control the pulse width modulated frequency applied to the plurality of switch devices.

11. The system of claim 10, including a brushless direct current motor having a plurality of phases that are pulsed via the driver circuit by the controller in the normal mode and the boost mode.

12. The system of claim 10, in which the configuration register includes a slope register to select a slope of the voltage at the load voltage input with respect to a duty cycle of the plurality of switch devices during the boost mode.

13. The system of claim 12, in which the configuration register includes a duty cycle register to select the duty cycle of the plurality of switch devices based on the magnitude of the voltage at the load voltage input during the boost mode.

14. The system of claim 13, in which the duty cycle register specifies a load voltage value where the boost mode terminates and synchronous rectification is provided by the plurality of switch devices to drive the load voltage.

15. A method comprising:
    controlling at least one switch device to supply electrical power to windings of a motor from an external supply that is available to supply the electrical power for the motor and a load;
    monitoring the electrical power for a supply-loss event; and
    in response to detecting the supply-loss event, controlling a duty cycle of the at least one switch device to operate in a boost mode using electrical power from the windings of the motor to control the electrical power during a selected portion of the supply-loss event; and in response to voltage at an input coupled to the at least one switch and the load and the motor reaching a predetermined threshold during the supply-loss event, terminating the boost mode and initiating synchronous rectification of a back electromotive force (BEMF) voltage from the motor to drive the load.

16. The method of claim 15, including changing the duty cycle of the at least one switch device based on current feedback received from the motor during the supply-loss event.

17. The method of claim 16, including monitoring the peak current of the motor with a current sense resistor or a sense transistor device and controlling the duty cycle such that the output current from the motor is about one half of the monitored peak current.

* * * * *